United States Patent
Nishizawa et al.

(10) Patent No.: US 8,134,359 B2
(45) Date of Patent: Mar. 13, 2012

(54) MAGNETIC ROTATIONAL-ANGLE DETECTOR

(75) Inventors: Hiroshi Nishizawa, Tokyo (JP); Hajime Nakajima, Tokyo (JP); Takeshi Musha, Tokyo (JP); Yoichi Ohmura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 324 days.

(21) Appl. No.: 12/596,729

(22) PCT Filed: Apr. 17, 2008

(86) PCT No.: PCT/JP2008/057474
§ 371 (c)(1),
(2), (4) Date: Oct. 20, 2009

(87) PCT Pub. No.: WO2008/130002
PCT Pub. Date: Oct. 30, 2008

(65) Prior Publication Data
US 2010/0052664 A1    Mar. 4, 2010

(30) Foreign Application Priority Data

Apr. 20, 2007 (JP) ................................. 2007-111145

(51) Int. Cl.
*G01B 7/14* (2006.01)
(52) U.S. Cl. ......... 324/207.25; 324/207.23; 324/207.21; 324/200
(58) Field of Classification Search .................. None
See application file for complete search history.

(56) References Cited

U.S. PATENT DOCUMENTS

| 6,550,150 B1 | 4/2003 | Shirai et al. |
| 6,622,391 B1 | 9/2003 | Shirai et al. |
| 7,840,372 B2 * | 11/2010 | Lu ................................. 702/151 |
| 7,860,681 B1 * | 12/2010 | Schaub et al. ................ 702/151 |

FOREIGN PATENT DOCUMENTS

| JP | 56 90213 | 7/1981 |
| JP | 62 192615 | 8/1987 |
| JP | 62 247213 | 10/1987 |
| JP | 3 257326 | 11/1991 |
| JP | 2529960 | 6/1996 |
| JP | 8 204252 | 8/1996 |
| JP | 2001 12967 | 1/2001 |
| JP | 2001 124554 | 5/2001 |
| JP | 2005 214920 | 8/2005 |

* cited by examiner

*Primary Examiner* — Melissa Koval
*Assistant Examiner* — Trung Nguyen
(74) *Attorney, Agent, or Firm* — Oblon, Spivak, McClelland, Maier & Neustadt, L.L.P.

(57) ABSTRACT

The present invention provides a magnetic rotational-angle detector capable of detecting a position and a rotational angle of a rotating member with excellent accuracy. The magnetic rotational-angle detector includes device arrays (51, 52) constituted by a plurality of magnetic sensor devices which are arranged to cancel the n-th order harmonic components by each other. In the device arrays, the magnetic sensor devices corresponding to each other are arranged such that they are spaced apart with a distance of $(2m+1)\lambda$, and the arrangement of all the magnetic sensor devices and their orientations with respect to a power-supply terminal and a ground terminal are axisymmetrical about a straight line (2b) passing through a barycenric position (59) of all the magnetic sensor devices which is positioned on a straight line along a radial direction of a rotating drum (1).

2 Claims, 4 Drawing Sheets

MAGNETIC ROTATIONAL-ANGLE DETECTOR

TECHNICAL FIELD

The present invention relates to a magnetic rotational-angle detector for use in detecting a position of a rotational moving member.

BACKGROUND ART

A conventional magnetic rotational-angle detector is adapted to detect, with a magnetic sensor, a magnetic field caused by a magnetic medium which is alternately magnetized with a magnetization pitch λ on an outer periphery of a rotating drum, as illustrated in FIG. 1 in a Patent Document 1, for example. The magnetic sensor has magneto-resistive devices (MR device). This magnetic sensor utilizes characteristic of the MR device that an electric resistance of the MR device is changed by the magnetic field. A rate of the change of the resistance in the MR device depends on a magnitude of the magnetic field, substantially regardless of a direction of the magnetic field. The MR device detects change of intensity of the magnetic field associated with the rotation of the rotating drum, which enables detection of the rotational angle of the rotating drum on the basis of a sinusoidal output signal generated by the MR device.

Although enhancement of the resolution and the accuracy in the detection of the rotational angle can be realized by interpolating the sinusoidal output signal electrically from the magnetic sensor, this is enabled on the condition that the sinusoidal output signal outputted from the magnetic sensor contains small distortions and, therefore, are close to an ideal sine wave. However, the output from the individual MR device has a non-linear relation between the intensity of the magnetic field and the sensitivity characteristic of the MR device. Therefore, in many cases, an output waveform from the magnetic sensor is not the ideal sine wave and contains harmonic distortions superimposed thereon.

In order to eliminate the aforementioned harmonic components from the sinusoidal output signal from the magnetic sensor, it is possible to realize this as follows.

That is, with respect to the n-th order harmonic, outputs from the devices spaced apart from each other with λ/n can be subtracted from each other or outputs from the devices spaced apart from each other with λ/(2n) can be summed up in order to cancel the n-th order harmonic component.

As described above, owing to the arrangement of the MR devices and the operation of subtraction or summation of the signals, it is possible to obtain output signal close to the ideal sine wave by eliminating the harmonic components from the output signal of the magnetic sensor, thereby enabling detection of the position and the rotational angle of the rotating member with high accuracy.

Patent Document 1: Japanese Patent No. 2529960

DISCLOSURE OF INVENTION

Subject to be solved by the Invention As described above, in order to eliminate the harmonic components from the output signal of the magnetic sensor, it is possible to realize this by adding or subtracting the outputs from the MR devices spaced apart from each other by a predetermined interval. However, the rotating drum has a circular arc shape, while the magnetic sensor has a flat-plate shape. Accordingly, respective MR devices receive different intensities of the magnetic field, due to the different effective distances between the rotating drum and the respective MR devices.

As a result, an imbalance occurs among the amplitudes of the output signals from the respective MR devices. Consequently, even if the outputs from the respective MR devices are added or subtracted with or from each other, components which cannot be canceled because of opposite phases are left. Therefore, the harmonic distortions are left in the waveform of the output signal from the magnetic sensor, which has obstructed to improve the accuracy in detecting the rotation.

Further, JP S56-90213A discloses a mechanism for alleviating an influence of a change of an ambient temperature on a distance from a magnetic sensor to a magnetic storage medium, in a position detector employing the MR devices. However, in the invention of this publication, even if respective MR devices are arranged symmetrically about the center of a magnetic sensor, the direction of the differential among signal outputs from the respective MR devices is not reversed. Accordingly, in the invention of this publication, it is impossible to provide a function for canceling the harmonic components, which is caused by the symmetrical arrangement of the MR devices.

Further, MR devices generate outputs which slightly vary depending on the direction of the magnetic field. This is called hysteresis. The hysteresis is a phenomenon induced by the difference in device sensitivity according to the direction of the magnetic field, namely the polarities thereof. When the alternately-magnetized drum is rotated, an S pole and an N pole alternately pass through the MR device and, thus, the MR device generates an output signal of which an amplitude and a waveform are varied alternately on every waveform.

Accordingly, in order to eliminate the influence of the hysteresis, the outputs from the MR devices spaced apart from each other with λ or (2n+1)λ (n is an integer) are summed up. This can average the outputs corresponding to two waveforms, and can cancel the sensitivity difference between the MR devices due to the polarities, thereby eliminating the influence of the hysteresis.

However, as described above, the respective MR devices receive different magnetic field intensities, due to the different effective distances between the rotating drum and the respective MR devices. This induces an imbalance among the amplitudes of the output signals from the respective MR devices. This results in an insufficient elimination of the hysteresis from the waveform of the output signal from the magnetic sensor, which has obstructed to improve the accuracy in detecting the rotation.

Further, JP S62-192615A discloses to eliminate the hysteresis in a magnetic head for a magnetic encoder, by arranging MR devices at intervals of (2u−1)λ (u is a positive integer). However, this publication does not disclose to arrange the MR devices symmetrically about a symmetric axis of a substrate.

Further, in JP H3-257326A, in order to attain the size reduction of a magnetic sensor, it discloses to alternately arrange MR devices forming a sine-wave-signal output portion and MR devices forming a cosine-wave-signal output portion with the numbers of both the MR devices being the same. However, this publication does not disclose the positions at which a power-supply terminal and a ground terminal, connected to the MR devices, are arranged.

Further, JP 2005-214920A discloses to superimpose displacement detection signals obtained from a plurality of MR devices on one another, in order to eliminate the harmonic components, in a magnetic sensor. Further, this publication describes the fact that the MR devices should be arranged symmetrically but other connecting methods can be employed. Thus, it does not describe the advantage of the aforementioned symmetric arrangement.

Therefore, the present invention is made in order to overcome the aforementioned problems and aims to provide a magnetic rotational-angle detector capable of detecting a position and a rotational angle of a rotating member with excellent accuracy.

Means for Solving the Problems

In order to achieve the above-mentioned object, the present invention is configured as follows.

Specifically, a magnetic rotational-angle detector according to a first aspect of the present invention including a rotating drum having a magnetic medium alternately magnetized with a magnetization pitch λ at an arc-shaped outer periphery thereof in a circumferential direction and being adapted to rotate in the circumferential direction, and a plurality of magnetic sensor devices arranged in parallel with one another on a substrate placed oppositely to the outer periphery of the rotating drum and adapted to detect a change of intensity of a magnetic field of the magnetic medium due to the rotation of the rotating drum, the magnetic rotational-angle detector comprising:

device arrays; each of which includes a plurality of magnetic sensor devices, is configured to position the magnetic sensor devices with an arrangement which causes harmonic components of second and higher orders within output signals outputted from respective device arrays to be canceled, and is arranged on the substrate axisymmetrically with respect to a symmetric axis, and a differential amplifier connected to output terminals of the respective device arrays;

wherein the symmetric axis is an axis which passes through a barycentric position with respect to all the magnetic sensor devices on the substrate and is parallel to a rotary shaft of the rotating drum, the barycentric position being located on a straight line extending in a radial direction of the rotating drum, the magnetic sensor devices included in the respective device arrays are arranged on the substrate in the same manner and axisymmetrically with respect to the symmetric axis, a power-supply terminal and a ground terminal which are included in the respective device arrays and connected to the magnetic sensor devices are arranged axisymmetrically with respect to the symmetric axis in the device arrays, and a position and a rotational angle of the rotating drum are detected on a basis of an output signal of the differential amplifier.

Effects of the Present Invention

With the magnetic rotational-angle detector according to the first aspect of the present invention, the device arrays are arranged on the substrate axisymmetrically with respect to the symmetric axis. In the respective device arrays, the magnetic sensor devices are arranged on the substrate in the same manner. The magnetic sensor devices in the respective device arrays are arranged axisymmetrically about the symmetric axis. Accordingly, even if the devices arranged to cancel the n-th order harmonic components by each other can insufficiently eliminate harmonic components, it is possible to eliminate them again, utilizing the symmetry. Further, it is also possible to similarly eliminate the distortions caused by the hysteresis of the magnetic sensor devices. As a result, it is possible to completely or substantially completely eliminate the n-th order harmonic distortions and the distortions caused by the hysteresis, thereby enabling detection of the position and the angle of the rotating drum with excellent accuracy.

EXPLANATION OF REFERENCE NUMERALS

1: Magnetic drum
2: Magnetic detector
2b: Symmetric axis
3: Differential amplifier
11: Magnetic medium
12: Rotary shaft
50: Magnetic sensor device
51 and 52: Device array
59: Barycentric position
63 and 64: Device array
69: Barycentric position, and
101 and 102: Magnetic rotational-angle detector

BEST MODE FOR CARRYING OUT THE INVENTION

Hereinafter, magnetic rotational-angle detectors according to embodiments of the present invention will be described, with reference to the drawings. Further, through the drawings, like reference numerals designate the same or similar portions.

First Embodiment

Figure 1:
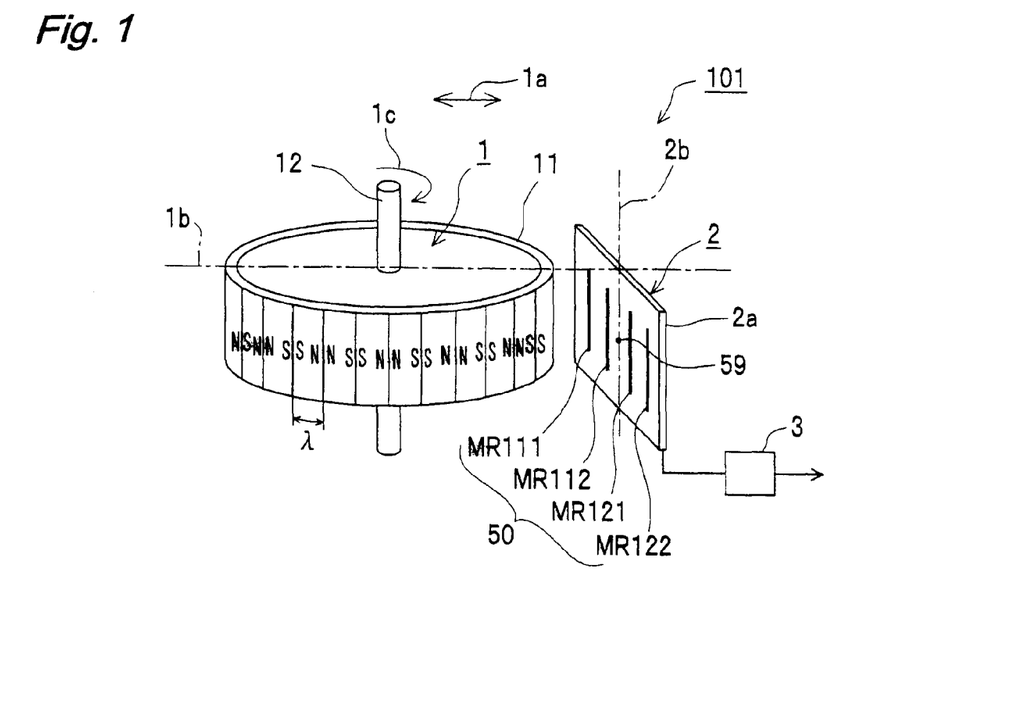
FIG. 1 is a perspective view of an overall structure of a magnetic rotational-angle detector according to a first embodiment of the present invention.

FIG. 1 is a structural view illustrating a magnetic rotational-angle detector 101 according to a first embodiment of the present invention. The magnetic rotational-angle detector 101 includes a magnetic drum 1 which is one example of a rotating member and corresponds to a rotating drum, a magnetic sensor device 50 and a differential amplifier 3, and detects a position and a rotational angle of the magnetic drum 1 based on an output signal of the differential amplifier 3.

The magnetic drum 1 has a magnetic medium 11 on the entire periphery of an outer circumferential portion in a circular-shaped rotating member and rotates in a circumferential direction 1c about a rotary shaft 12. The magnetic medium 11 is magnetized with alternate magnetic poles with a magnetization pitch λ in the circumferential direction 1c.

A magnetic detector 2 is formed from a substrate 2a constituted by a flat plate which is arranged oppositely to the magnetic medium 11 in the vicinity thereof in a non-contact manner. On the substrate 2a, a plurality of the magnetic sensor devices 50 which can detect a magnetic field formed by the magnetic medium 11 are arranged. As the magnetic sensor device 50, a magneto-resistive device (MR device) or a giant magneto-resistive device (GMR device) can be used. In the first embodiment and a second embodiment which will be described later, the magneto-resistive device (hereinafter, referred to as "MR" or "MR device") is employed as the magnetic sensor device. In the first embodiment, an MR 111, an MR 112, an MR 121 and an MR 122 are arranged such that they are spaced apart from one another with predetermined distances which will be described later. Further, the MRs 111, 112, 121 and 122 are arranged such that their longitudinal directions are orthogonal to an arranging direction of the magnetic poles in the magnetic mediums 11, in other words, the circumferential direction 1c of the magnetic drum 1.

Figure 2:
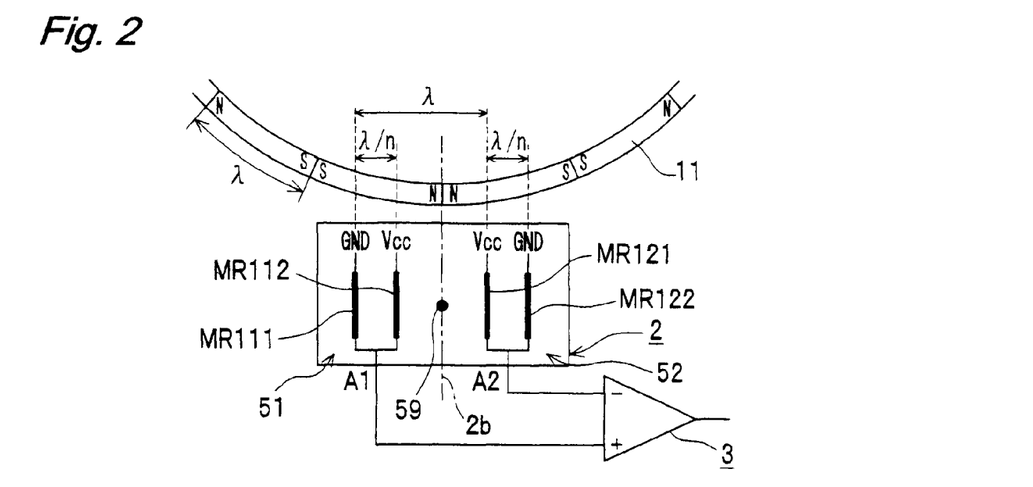
FIG. 2 is a view illustrating an arrangement of magnetic sensor devices included in the magnetic rotational-angle detector illustrated in FIG. 1.

FIG. 2 schematically illustrates the relative positional relationship between the magnetic drum 1 and the devices which are the MR 111, the MR 112, the MR 121 and the MR 122 included in the magnetic detector 2. On the substrate 2a of the magnetic detector 2, the MRs 111, 112, 121 and 122 are arranged in parallel with one another, as illustrated in the figure. Further, a reference numeral "59" designates a barycentric position of these MRs 111, 112, 121 and 122 on the substrate 2a. The substrate 2a in the magnetic detector 2 is arranged oppositely to the magnetic medium 11 such that the substrate 2a does not come into contact with the magnetic medium 11, such that the barycentric position 59 is positioned on a straight line 1b extending in a radial direction 1a of the magnetic drum 1. Further, a symmetric axis 2b is designated by a straight line which passes through the barycentric position 59 and also is parallel with the rotary shaft 12 of the magnetic drum 1. Each of the MRs 111, 112, 121 and 122 is arranged in parallel with the symmetric axis 2b.

Further, the MR 111 and the MR 112 form one device array 51, while the MR 121 and the MR 122 form the other device array 52. The device array 51 and the device array 52 are arranged on the substrate 2a axisymmetrically with respect to the symmetric axis 2b, and the MR devices are arranged in the same manner in the respective device arrays 51 and 52. That is, the number of the MR devices, the distance between adjacent MR devices and the state of the electric connection thereamong in the device array 51 are the same as those in the device array 52. Further, the MRs 111, 112, 121 and 122 are arranged in the respective device arrays 51 and 52 such that harmonic components of the second and higher orders in the respective output signals from the device arrays 51 and 52 are canceled by each other. Further, the MRs 111, 112, 121 and 122 arranged in the device array 51 and the device array 52 are arranged axisymmetrically or substantially axisymmetrically with respect to the symmetric axis 2b.

Further, the number of the MR devices included in each device array 51, 52 is not limited to the two as in the present embodiment and can be any number more than one.

Further, the MR 111 and the MR 112, and the MR 121 and the MR 122 are arranged such that they are spaced apart from each other by a distance of $\lambda/n$ (n is an integer of 2 or more). Further, the MR 111 and the MR 121 are spaced apart from each other by $\lambda$. Further, the distance between the MR 111 and the MR 121, namely the distance between a pair of MR devices arranged at the same position in the respective device arrays 51 and 52 is not limited to $\lambda$ and, generally, can be set to $(2m+1)$ times the length of $\lambda$ (in this case, m is an integer).

Figure 3:
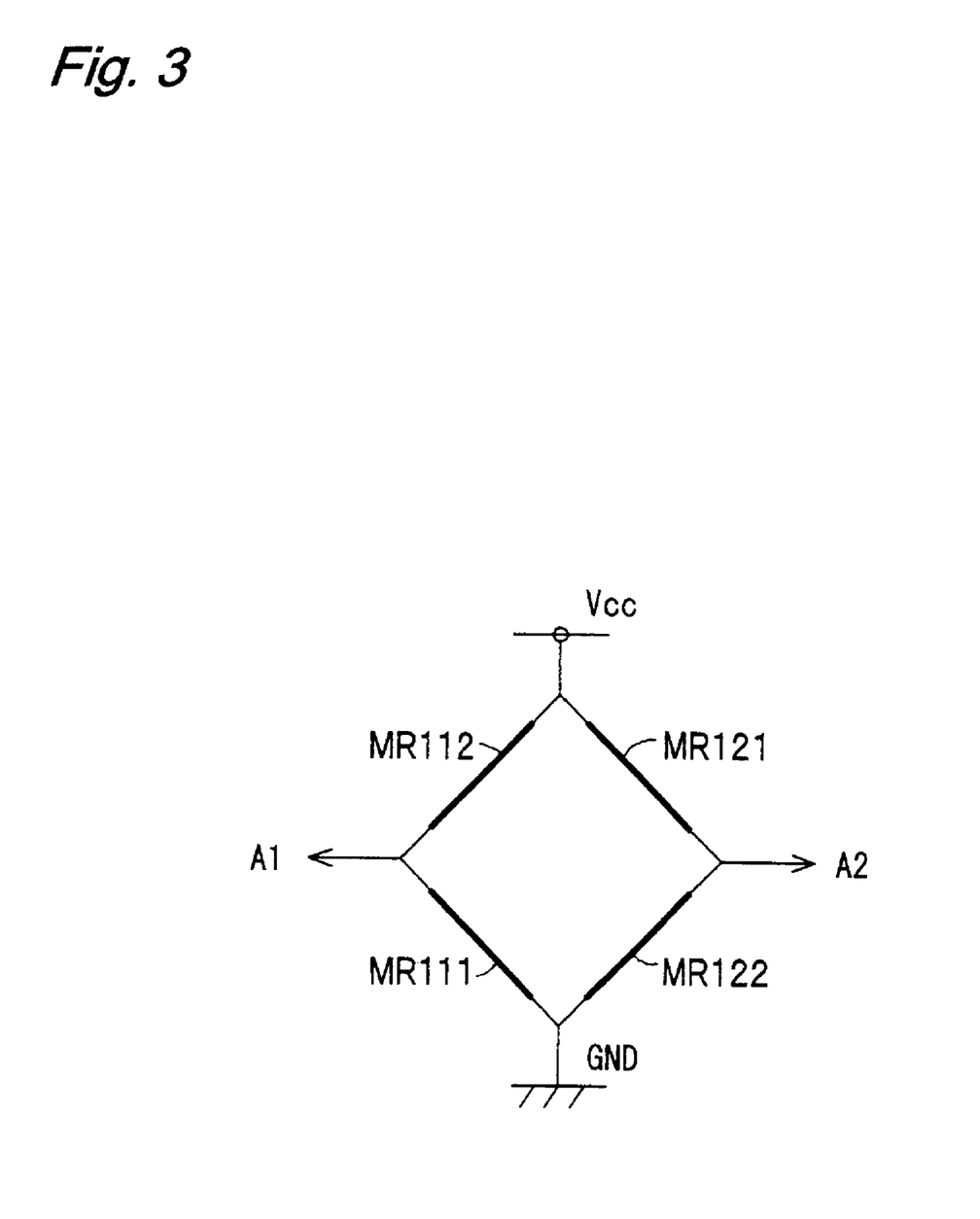
FIG. 3 is a view of wirings among the magnetic sensor devices included in the magnetic rotational-angle detector illustrated in FIG. 1.

On the other hand, as illustrated in FIG. 3, the MR 111, the MR 112, the MR 121 and the MR 122 are connected so as to form a Wheatstone bridge circuit, wherein the MR 111 and the MR 112 are connected in series, and the MR 111 is grounded while the MR 112 is connected to a power supply. Similarly, the MR 121 and the MR 122 are connected in series, and the MR 122 is grounded while the MR 121 is connected to the power supply.

Further, as illustrated in FIG. 2, output terminals A1 and A2 of the Wheatstone bridge circuit are connected to the differential amplifier 3. The differential amplifier 3 outputs a differential voltage between the device array 51 and the device array 52.

Next, there will be described a method for detecting the position and the rotational angle of the magnetic drum 1 with excellent accuracy using the magnetic rotational-angle detector 101 having the aforementioned structure, and, further, there will be described the fact that the harmonic distortions included in the output signals and distortions caused by the hysteresis can be effectively eliminated.

Since the MR 111 and the MR 112 are spaced apart from each other by the distance of $\lambda/n$, it is possible to cancel and eliminate the n-th order harmonic components of them, in principle, by obtaining the differential therebetween. However, since the substrate 2a provided with the MR 111 and the like has a flat surface while the magnetic medium 11 has an arc shape, therefore the distances from the MRs 111 and 112 to the surface of the magnetic medium 11 are practically different from each other. This induces a difference between the amplitudes of outputs from the MR 111 and the MR 112. Accordingly, even if the differential between the outputs from the MR 111 and the MR 112 is outputted, components of harmonic distortion corresponding to the difference of the amplitudes are left. This phenomenon becomes more prominent with decreasing diameter of the magnetic drum 1 and obstructs the improvement of the detection accuracy. Similarly, even if the differential between the MR 121 and the MR 122 is outputted, components of harmonic distortion are left.

It is assumed that voltages of the output signals from the output terminals A1 and A2 are V1 and V2. A pair formed by the MR 111 and MR 112, and a pair formed by the MR 121 and MR 122 are arranged at positions spaced apart from each other by $\lambda$ and, also, have polarities opposite from each other at their power-supply sides and their grounded sides. Accordingly, main components S1 and S2 in the output signals of V1 and V2 have the same amplitude but have opposite phases.

Namely, the following equation holds.

$$S1 = -S2 \quad \text{(Equation 1)}$$

On the other hand, when obtaining the differential between the MR 111 and the MR 112, the harmonic distortion components which have not been eliminated due to the imbalance between the amplitudes of outputs can be expressed as follows.

Distortion components h1 caused by the differential between the MR 111 and the MR 112 are left due to the imbalance between the differential outputs from the bridge circuit, and this can be approximately expressed in the form of the difference between the output from the power-supply side of the device and the output from the grounded side of the device, as follows.

$$h1 = hMR112 - hMR111 \quad \text{(Equation 2)}$$

In this case, "hMR111" and "hMR112" represent the harmonic distortion components caused by the MR 111 and the MR 112, respectively.

Similarly, in the case of the pair formed by the MR 121 and the MR 122, distortion components h2 can be expressed as follows.

$$h2 = hMR121 - hMR122 \quad \text{(Equation 3)}$$

Assuming that any of the MR devices have substantially the same sensitivity characteristic with respect to the magnetic field intensity, the magnitudes of the hMR111, hMR112, hMR121 and hMR122 depend only on the effective distances between the magnetic medium 11 and the respective MR devices.

Therefore, the following expressions can hold, assuming that f is a function.

$$h1 = f(d112) - f(d111) \quad \text{(Equation 4)}$$

$$h2 = f(d121) - f(d122) \quad \text{(Equation 5)}$$

In this case, "d111", "d112", "d121" and "d122" represent the effective distances between the magnetic medium 11 and the respective MR devices.

The arrangement of the MRs 111, 112, 121 and 122 is axisymmetrical with respect to the barycentric position 59 and, therefore, d111=d122, and d112=d121.

Accordingly, the following equation holds.

$$h1 = h2 \quad \text{(Equation 6)}$$

Thus, the distortion components contained in the outputs from the output terminals A1 and A2 have the same amplitude and the same polarity.

From the aforementioned description, the output signals V1 and V2 are the sums of their main components S1 and S2 and the distortions h1 and h2.

Therefore, the following equations hold.

$$V1 = S1 + h1 \quad \text{(Equation 7)}$$

$$V2 = S2 + h2 \quad \text{(Equation 8)}$$

In this case, S1=−S2, and h1=h2, as described above.

The output terminals A1 and A2 are connected to the differential amplifier 3 and, therefore, the differential output V1−V2 is expressed as follows.

$$\begin{aligned} V1 - V2 &= (S1 + h1) - (S2 + h2) \\ &= (S1 + h1) - (-S1 + h1) \\ &= 2 \times S1 \end{aligned} \quad \text{(Equation 9)}$$

As described above, with the present structure, it is possible to completely or substantially completely eliminate the distortion components h1 and h2 which have not been eliminated using the differential provided by the bridge circuit.

As described above, in the structure constituted by the combination of the arc-shaped magnetic drum 1 and the flat-plate shaped magnetic detector 2, even when the effective distances between the respective MR devices and the magnetic drum 1 are different from one another due to the curvature of the magnetic drum 1, it is possible to completely or substantially completely eliminate the n-th order harmonic distortion components, thereby enabling detection of the position and the rotational angle of the rotating member with excellent accuracy, because corresponding MR devices forming one pair in the respective device arrays are arranged at the same distance, further the polarities of the power-supply sides and the grounded sides in the respective device arrays are opposite and, further, the MR devices are arranged axisymmetrically with respect to the barycentric position 59.

Similarly, it is also possible to completely or substantially completely eliminate the distortions caused by the hysteresis, as follows.

The hysteresis is caused mainly by the difference of the sensitivity among the MR devices due to the polarities of the magnetic field. In principle, by summing the outputs from the MR devices spaced apart from each other by a distance of λ, it is possible to eliminate the hysteresis through the effect of averaging. However, in a case where the barycentric position 59 does not exist on the straight line extending from the rotational center of the magnetic drum 1 in the radial direction 1a and, also, the MR devices are not arranged axisymmetrically about the barycentric position 59, the effective distances between the respective MR devices and the magnetic drum 1 are different from one another. This causes the respective MR devices to receive different magnetic field intensities, which makes it impossible to completely eliminate the hysteresis. The aforementioned description will be described hereinafter, with reference to FIG. 4A and FIG. 4B.

Figure 4A:
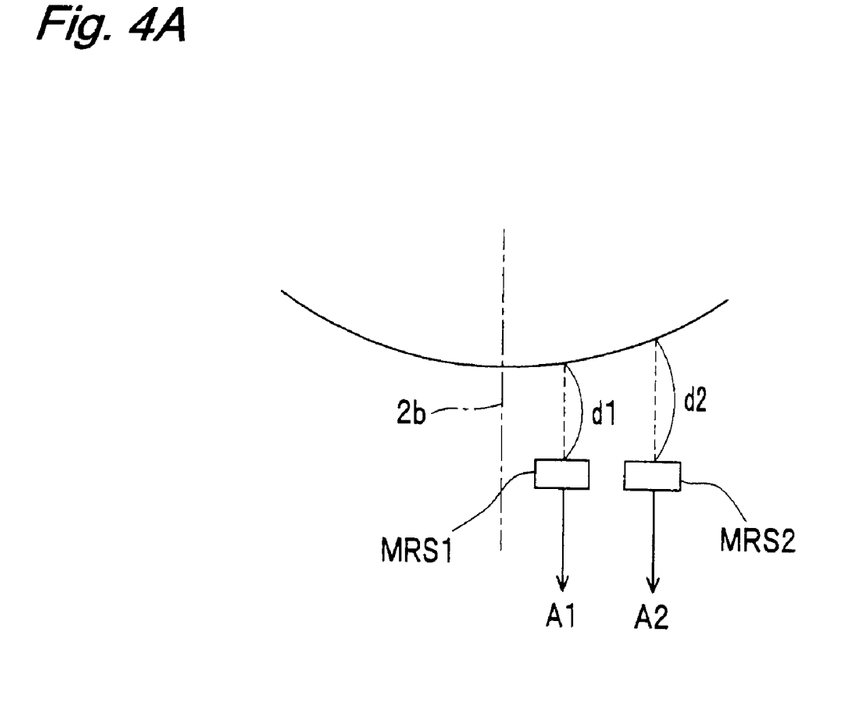
FIG. 4A is a view for explaining a case where magnetic sensor devices are not arranged axisymmetrically.

FIG. 4A illustrates a case where a device array MRS1 connected to the terminal A1 and a device array MRS2 connected to the terminal A2 are not arranged symmetrically with respect to the aforementioned symmetric axis 2b.

The power-supply side and the grounded side in the respective device arrays MRS1 and MRS2 are opposite from each other as illustrated in FIG. 2 and, therefore, the signals at the terminal A1 and the terminal A2 have polarities opposite from each other. Further, the signals at the terminal A1 and the terminal A2 are amplified by the differential amplifier 3 and, therefore, actually the output signals from the terminal A1 and the terminal A2 are summed. The output signals from the terminal A1 and the terminal A2 depend on the sensitivities of the MR devices with respect to the direction of the magnetic field and on the effective distances between the magnetic drum 1 and the MR devices. Assuming that fs and fn are functions indicative of their sensitivities with respect to the direction of the magnetic field, a final output in the structure illustrated in FIG. 4A, namely the output from the differential amplifier, is the result of the summation of the output signals from the terminal A1 and the terminal A2.

Accordingly, the following equation holds.

$$\begin{aligned} [\text{Final Output}(a)] &= A1 + A2 \\ &= fs(d1) + fn(d2) \end{aligned} \quad \text{(Equation 10)}$$

In this case, "d1" and "d2" are the distances from the device array MRS1 and the device array MRS2 to the magnetic drum 1, respectively, as illustrated in the figure.

Further, when the magnetic drum 1 is rotated just by the magnetization pitch λ from the state of Equation 10, the direction of the magnetic field which is received by the device arrays MRS1 and MRS2 is reversed.

Accordingly, the following equation holds.

$$\begin{aligned} [\text{Final Output}(a)] &= A1 + A2 \\ &= fn(d1) + fs(d2) \end{aligned} \quad \text{(Equation 11)}$$

In the structure of FIG. 4A, the device array MRS1 and the device array MRS2 are not arranged symmetrically and, therefore, the distance d1 and the distance d2 are not equal to each other. Accordingly, the Equation 10 and the Equation 11 are clearly different from each other. That is, when the magnetic drum 1 is rotated, the amplitude of the final output is varied on a wave-by-wave basis. This makes it impossible to completely eliminate the influence of the hysteresis.

Figure 4B:
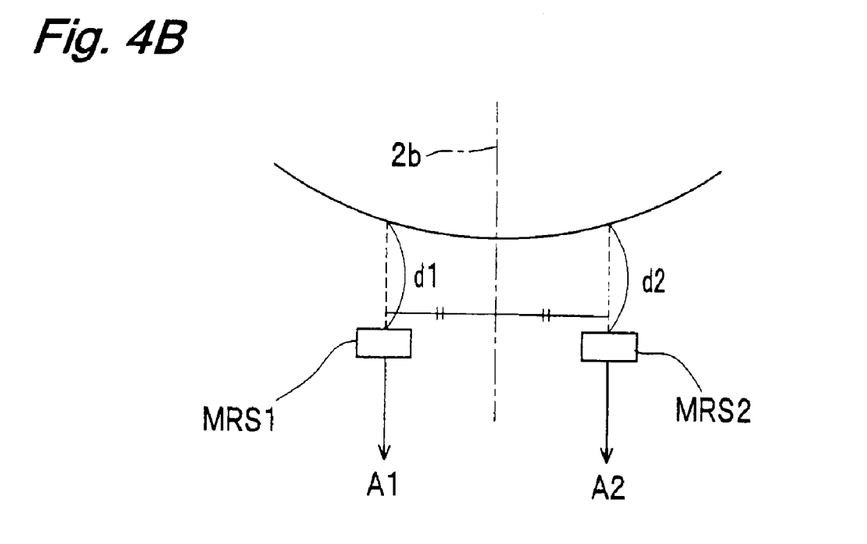
FIG. 4B is a view for explaining a case where magnetic sensor devices are arranged axisymmetrically.

On the other hand, FIG. 4B illustrates a case where the device array MRS1 connected to the terminal A1 and the device array MRS2 connected to the terminal A2 are arranged axisymmetrically with respect to the symmetric axis 2b. In this case, a final output (b) can be considered on the basis of the aforementioned final output (a), but is different therefrom in that d2=d1.

Accordingly, the following equation holds.

$$[\text{Final Output }(b)] = A1 + A2 \quad \text{(Equation 12)}$$
$$= fs(d1) + fn(d2)$$
$$= fs(d1) + fn(d1)$$

Further, when the magnetic drum 1 is rotated just by the magnetization pitch λ from the state of Equation 12, this reverses the direction of magnetic field which is received by the device arrays MRS1 and MRS2.

Accordingly, the following equation holds.

$$[\text{Final Output }(b)] = A1 + A2 \quad \text{(Equation 13)}$$
$$= fn(d1) + fs(d2)$$
$$= fn(d1) + fs(d1)$$

Thus, the Equation 12 and the Equation 13 are completely equal to each other.

Accordingly, with the structure illustrated in FIG. 4B, namely with the structure that the device array MRS1 and the device array MRS2 are arranged axisymmetrically with respect to the symmetric axis 2b, even when the MR devices have different sensitivities with respect to the direction of the magnetic field, it is possible to get the same output from the respective device arrays MRS1 and MRS2. This enables completely or substantially completely eliminating the distortions of waveform due to the hysteresis.

As described above, according to the magnetic rotational-angle detector 101 of the present embodiment, it is possible to completely or substantially completely eliminate the n-th order harmonic distortions and the distortions caused by the hysteresis, thereby enabling detection of the position and the angle of the rotating member with excellent accuracy.

Second Embodiment

Figure 5:
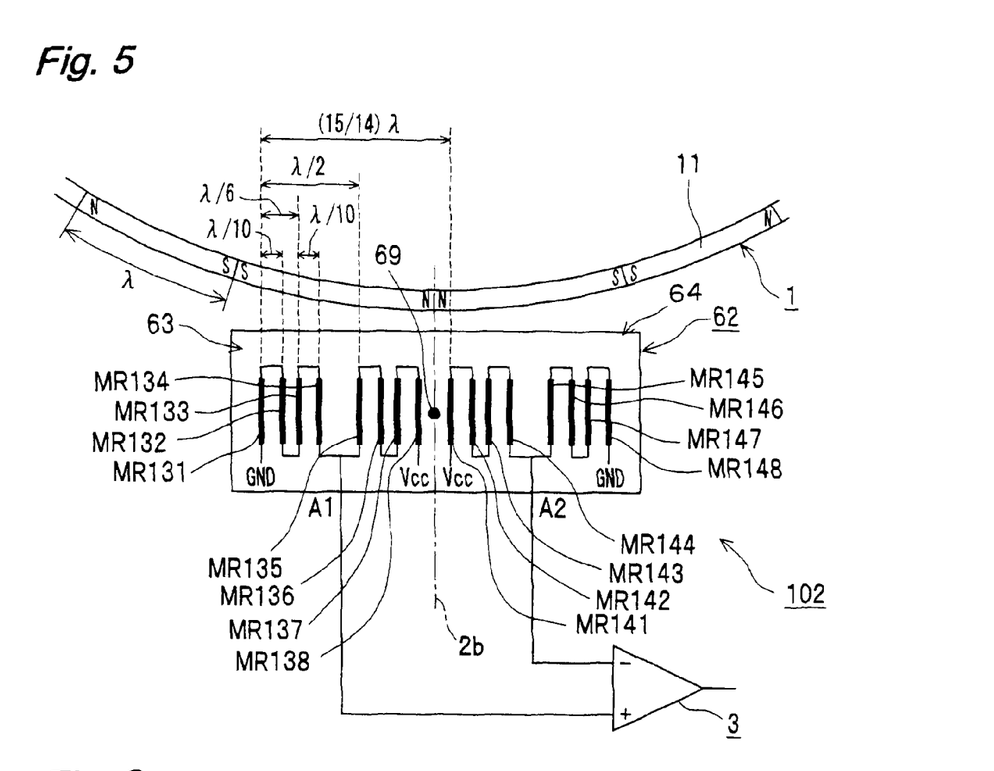
FIG. 5 is a view illustrating an arrangement of magnetic sensor devices included in a magnetic rotational-angle detector according to a second embodiment of the present invention.

FIG. 5 is a view illustrating a structure of a magnetic rotational-angle detector 102 according to a second embodiment of the present invention. The structure of the magnetic rotational-angle detector 102 is the same as the structure of the magnetic rotational-angle detector 101, except that the arrangement of magnetic sensor devices is different. Accordingly, portions having the same structures will not be described herein and, there will be described below the configuration of the arrangement of the magnetic sensor devices, which is the difference. Further, a reference numeral "62" designates a magnetic detector including a substrate 2a on which magnetic sensor devices are arranged in the magnetic rotational-angle detector 102.

As illustrated in FIG. 5, on the substrate 2a in the magnetic detector 62, two device arrays 63 and 64 are arranged axisymmetrically with respect to a symmetric axis 2b passing through a barycentric position 69. Each of the device arrays 63 and 64 includes magnetic sensor devices which are arranged in the same manner on the substrate 2a constituted by a flat plate, and are also arranged axisymmetrically with respect to the straight line 2b as a symmetric axis with distances which will be described later. The device array 63 has MRs 131 to 138 as the magnetic sensor devices, and the device array 64 has MRs 141 to 148 as the magnetic sensor devices. Further, the number of the MRs included in each device array 63, 64 is not limited to eight as in the present embodiment and can be any number more than one. The MRs 131 to 138 and the MRs 141 to 148 are arranged in parallel with one another and, are also arranged such that their longitudinal directions are orthogonal to the direction of the arrangement of the magnetic poles in the magnetic medium 11. Further, the barycentric position 69 is a barycentric position with respect to the MRs 131 to 138 and the MRs 141 to 148. This barycentric position 69, similar to the barycentric position 59, is positioned on the straight line 1b and the symmetric axis 2b passes therethrough.

The arrangement of the MRs 131 to 138 and 141 to 148 is as follows.

At first, in each of the pairs of the MR 131 and the MR 132, the MR 133 and the MR 134, the MR 135 and the MR 136, and the MR 137 and the MR 138, a distance between the devices is λ/10. A distance between the MR 131 and the MR 133, and a distance between the MR 135 and the MR 137 are both λ/6. Further, a distance between the MR 131 and the MR 135 is λ/2. Further, the MRs 141 to 148 are arranged at the same distances as those of the MRs 131 to 138. Further, a distance between the MR 131 and the MR 141 is (15/14)λ.

Further, in the case where the two device arrays 63 and 64 each include eight MRs, the distance between a pair of magnetic sensor devices arranged at the same position in the respective device arrays, which correspond to the MR 131 and the MR 141, is not limited to the aforementioned (15/14)λ and can be set to (2m+1±(1/14)λ) in general, where, m is an integer.

Figure 6:
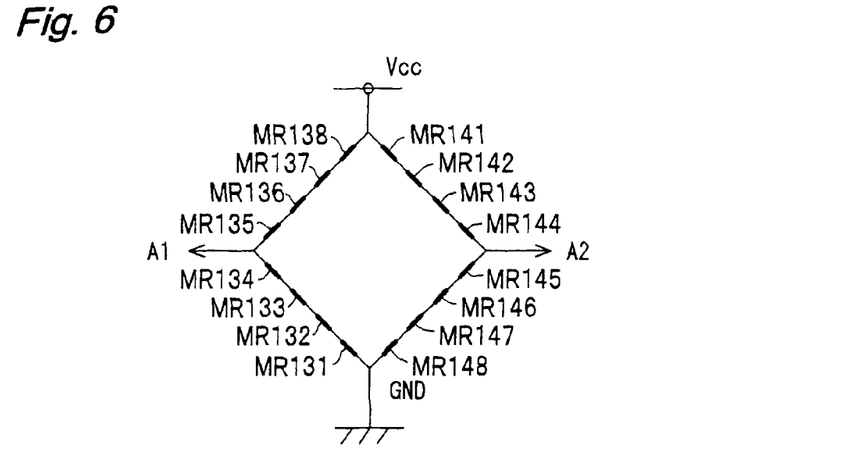
FIG. 6 is a view of wirings among the magnetic sensor devices included in the magnetic rotational-angle detector illustrated in FIG. 5.

FIG. 6 illustrates electric wirings among the 16 magnetic sensor devices which are the MRs 131 to 138 and 141 to 148. The MR 131 to the MR 138 are connected in series and, similarly, the MR 141 to the MR 148 are connected in series. It is assumed that output terminals arranged at the mid points in the electric potentials thereamong are A1 and A2, and the terminals A1 and A2 are connected to the differential amplifier 3.

According to the arrangement of the respective MR devices in the aforementioned distances and the state of the electrical wiring of them, it is possible to cancel the harmonic components in the signals outputted from the terminals A1 and A2 by each other.

There will be described operations of the magnetic rotational-angle detector 102 with such a structure, namely, a method for detecting the rotation.

At first, the four magnetic sensor devices which are the MRs 131 to the MR 134 are wired in a folded-back manner and are electrically connected to one another in series. Accordingly, the MRs 131 to 134 output signals equivalent to the sum of the outputs from the respective four magnetic sensors. Similarly, the MRs 135 to 138 are connected to one another in series, and the MRs 135 to 138 also output signals equivalent to the sum of the outputs from the respective four magnetic sensors. As a result, the output from the terminal A1 corresponds to the differential output of between the sum of the MRs 131 to 134 and the sum of the MRs 135 to 138.

On the other hand, for coping with the n-th order harmonic distortions, it is possible to cancel the n-th order components and eliminate them by obtaining the differential between the outputs from the devices spaced-apart with the distance of λ/n, or summing the outputs from the devices spaced-apart with the distance of λ/(2n). In the arrangement of FIG. 5, in each of the pairs of the MR 131 and the MR 132, the MR 133 and the MR 134, the MR 135 and the MR 136, and the MR 137 and the MR 138, each pair is equivalent to summation of the outputs from the magnetic sensor devices spaced-apart with the distance of λ/10 from each other. Accordingly, it is possible to eliminate the fifth-order harmonic distortions by the aforementioned respective pairs.

Further, in each of the pairs of the MR 131 and the MR 133, the MR 132 and the MR 134, the MR 135 and the MR 137, and the MR 136 and the MR 138, each pair is equivalent to summation of the outputs from the magnetic sensor devices spaced-apart with the distance of λ/6 from each other. Accordingly, it is possible to eliminate the third-order harmonic distortions with these pairs.

Further, in the device array of the magnetic sensor devices of the MRs 131 to 134 and in the device array of the magnetic sensor devices of the MRs 135 to 138, the MR devices corresponding to each other are arranged to be spaced apart from each other by λ/2. For example, each pair of the MR 131 and the 135, the MR 132 and the MR 136, ... are arranged to be spaced apart from each other by λ/2. Further, the terminal A1 is structured to obtain the differential between the device array of the magnetic sensor devices of the MRs 131 to 134 and the device array of the magnetic sensor devices of the MRs 135 to 138. Thus according to this structure, it is possible to eliminate the second-order harmonics and, further, the even-ordered harmonics because the structure offers effects similar to the summation of signals with opposite phases.

With the structure described above, the terminal A1 outputs signals from which each harmonics of the even-ordered, third-order, and fifth-order is eliminated.

Similarly to the above, the terminal A2 in the device array 64 of the MRs 141 to 148 outputs signals from which respective harmonics of the even-ordered, third-order, and fifth-order are eliminated.

Next, the output signals from the terminal A1 and the terminal A2 are inputted to the differential amplifier 3. In the device array 63 with the terminal A1 and the device array 64 with the terminal A2, since their power-supply sides and their grounded sides are oriented oppositely from each other, therefore the terminal A1 and the terminal A2 output signals having the opposite phases from each other. Accordingly, the differential between the terminal A1 and the terminal A2, which is the final output, offers similar effects to those of a summing operation.

On the other hand, each of the magnetic sensor devices in the device array 63 connected to the terminal A1 and each of the magnetic sensor devices in the device array 64 connected to the terminal A2 are arranged spaced apart from each other with a distance of (15/14)λ. Accordingly, by summing the outputs from the terminal A1 and the terminal A2, the seventh-order harmonics can be eliminated.

As described above, the device array 63 near the terminal A1 and the device array 64 near the terminal A2 are arranged axisymmetrically with respect to the symmetric axis 2b. Accordingly, as described in the first embodiment, in the device arrays 63 and 64 connected to the terminal A1 or the terminal A2, even when the distortions caused by the amplitude imbalance due to the arrangement of the arc-shaped magnetic drum 1 and the flat-plate shaped magnetic detector 62 have not been completely eliminated in eliminating harmonics of the even-ordered, third-order, and fifth-order, it is possible to eliminate the remaining distortion components, by obtaining the differential between the outputs from the terminal A1 and the terminal A2.

Further, since the device array 63 near the terminal A1 and the device array 64 near the terminal A2 are spaced apart from each other with (15/14)λ as described above, it is possible to eliminate the seventh-order harmonics. In this case, the device array 63 near the terminal A1 and the device array 64 near the terminal A2 are arranged symmetrically with respect to the barycentric position 69, which substantially eliminates the amplitude imbalance, thereby completely or substantially completely eliminating the seventh-order components.

Further, the device array 63 connected to the terminal A1 and the device array 64 connected to the terminal A2 are spaced apart from each other with the distance of (15/14)λ, and this distance can be approximately regarded as λ. In order to eliminate the hysteresis, it is possible to realize this by summing up the outputs from the devices spaced apart from each other with λ, as described in the first embodiment. The device array 63 and the device array 64 are arranged symmetrically with respect to the barycentric position 69 and, therefore, there is substantially no imbalance between the amplitudes from them. This enables completely or substantially completely eliminating the distortions caused by the hysteresis.

As described above, according to the magnetic rotational-angle detector 102 of the second embodiment, it is possible to completely or substantially completely eliminate the harmonic distortions of the even-ordered, third-order, fifth-order, and seventh-order and the distortions caused by the hysteresis at the same time. This enables detection of the angle with excellent accuracy.

Further, it is possible to combine arbitrary embodiments out of the aforementioned various embodiments as required for offering the effects of the respective embodiments.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

Further, the contents of the disclosures in the specification, the drawings, the claims and the abstract of Japanese Patent Application No. 2007-111145, filed on Apr. 20, 2007, are hereby incorporated by reference in its entirety.

INDUSTRIAL APPLICABILITY

The present invention is applicable for a magnetic rotational-angle detector for use in detecting a position of a rotational moving member.

The invention claimed is:
1. A magnetic rotational-angle detector, comprising:
a rotating drum having a magnetic medium, wherein the magnetic medium is alternately magnetized with a magnetization pitch λ at an arc-shaped outer periphery thereof in a circumferential direction and rotates in the circumferential direction;
a plurality of magnetic sensor devices arranged in parallel with one another on a substrate placed oppositely to the outer periphery of the rotating drum wherein the plurality of magnetic sensor devices detects a change of inten- sity of a magnetic field of the magnetic medium by the rotation of the rotating drum;

device arrays, each of which comprises a plurality of said magnetic sensor devices, positioned axisymmetrically with respect to a symmetric axis of the substrate, in an arrangement which cancels harmonic components of second and higher orders within output signals outputted from respective device arrays; and a differential amplifier connected to output terminals of the respective device arrays, wherein: the symmetric axis is an axis which passes through a barycentric position with respect to all the magnetic sensor devices on the substrate and is parallel to a rotary shaft of the rotating drum, wherein the barycentric position is located on a straight line extending in a radial direction of the rotating drum;

each of the device arrays has the same number of the magnetic sensor devices and the same distance between adjacent magnetic sensor devices;

a distance between a pair of magnetic sensor devices arranged at the same position in the device arrays is $(2m+1\pm(1/14))$ times the magnetization pitch $\lambda$ (m is an integer);

the respective device arrays comprise a power-supply terminal and a ground terminal connected to respective magnetic sensor devices, wherein the power-supply terminals and the ground terminals are arranged axisymmetrically with respect to the symmetric axis in the device arrays; and a position and a rotational angle of the rotating drum are detected by an output signal of the differential amplifier.

2. The magnetic rotational-angle detector according to claim 1, wherein the device arrays have a first device array and a second device array, each of which has eight magnetic sensor devices which are electrically connected in series and has an arrangement of the magnetic sensor devices in which the magnetic sensor devices are located at respective positions having distances from the magnetic sensor device at one end of the array of $\lambda/10$, $\lambda/6$, $(\lambda/6+\lambda/10)$, $\lambda/2$, $(\lambda/2+\lambda/10)$, $(\lambda/2+\lambda/6)$, $(\lambda/2+\lambda/6+\lambda/10)$ in order;

each of the distances between pairs of magnetic sensor devices arranged at the same position in the first and the second device arrays is $(15/14)\lambda$;

the respective output terminals of the first and the second device arrays are arranged at electric middle points of the eight magnetic sensor devices connected in series and are connected to the differential amplifier;

the differential amplifier produces a differential output by the outputs from the output terminals of the first and the second device arrays and outputs a sinusoidal signal from which harmonic distortions of a second-order, a third-order, a fifth-order and a seventh-order, and distortions caused by hysteresis are eliminated.

* * * * *